(12) United States Patent
Orr

(10) Patent No.: US 7,380,570 B1
(45) Date of Patent: Jun. 3, 2008

(54) THREE-WAY VALVE FOR USE WITH PAINTBALL MARKERS

(76) Inventor: Jeffrey George Orr, 779 Trinity Cir., Corona, CA (US) 92881

( * ) Notice: Subject to any disclaimer, the term of this patent is extended or adjusted under 35 U.S.C. 154(b) by 0 days.

(21) Appl. No.: 11/786,772

(22) Filed: Apr. 12, 2007

Related U.S. Application Data

(63) Continuation of application No. 10/948,960, filed on Sep. 24, 2004, now abandoned.

(60) Provisional application No. 60/506,379, filed on Sep. 25, 2003.

(51) Int. Cl.
*F16K 11/065* (2006.01)
(52) U.S. Cl. .................. 137/625.25; 137/625.67; 137/625.68; 137/625.69
(58) Field of Classification Search .......... 137/625.48, 137/338, 625.25, 625.67–625.69; 251/129.1, 251/129.07
See application file for complete search history.

(56) References Cited

U.S. PATENT DOCUMENTS

| | | | |
|---|---|---|---|
| 43,573 A | 7/1864 | Crane | 15/104.18 |
| 57,846 A | 9/1866 | Bausman | 15/104.16 |
| 143,139 A | 9/1873 | Gould | 15/104.16 |
| 645,932 A | 3/1900 | Ferrant | 89/125 |
| 1,167,178 A | 1/1916 | Hill | 124/56 |
| 1,343,127 A | 6/1920 | Halllinan | 124/54 |
| 1,743,576 A | 1/1930 | Smith | 124/72 |
| 2,453,683 A | 11/1948 | Caldow | 42/70 |
| 2,484,267 A | 10/1949 | Bower | 15/242 |
| 2,526,361 A * | 10/1950 | Johnson | 137/625.66 |
| 2,550,887 A | 5/1951 | Tratsch | 124/1 |
| 2,563,720 A | 8/1951 | Guisasola | 42/70 |
| 2,568,432 A | 9/1951 | Cook | 124/13 |
| 2,675,024 A * | 4/1954 | Clark | 137/625.68 |
| 2,834,332 A | 5/1958 | Guthrie | 124/13 |
| 2,845,055 A | 7/1958 | Collins et al. | 124/11 |
| 2,994,347 A * | 8/1961 | Gottwald | 137/625.68 |
| 2,997,065 A * | 8/1961 | Johnson | 137/625.69 |
| 3,089,476 A | 5/1963 | Wolverton | 124/11 |
| 3,089,509 A * | 5/1963 | Collins | 137/625.69 |

(Continued)

FOREIGN PATENT DOCUMENTS

DE    19518884    6/1994

(Continued)

*Primary Examiner*—John Rivell
*Assistant Examiner*—Craig Price
(74) *Attorney, Agent, or Firm*—Keisling Pieper & Scott PLC; David B. Pieper; Stephen D. Schrantz

(57) ABSTRACT

A novel three-way valve comprising a valve body, a valve sleeve for adjustable position mounting within the body, and a valve stem movable so as to selectively form a pathway between line recesses in the valve sleeve. Three line recesses are used to form a three way valve and the front and rear line recesses are provided around the diameter such that an increased number of apertures may be provided while reducing the diameter of the apertures themselves to provided the necessary fluid flow with a reduced throw requirement for the valve stem. Exhaust valves are provided to relieve pressure on the unused fluid path. Preferably, the apertures are equi-spaced around the recesses diameter to create a more efficient fluid flow. The valve has a knob and/or a hex key for making fine adjustments to the position of the valve sleeve for optimal efficiency.

20 Claims, 6 Drawing Sheets

U.S. PATENT DOCUMENTS

| | | | | |
|---|---|---|---|---|
| 3,203,439 A * | 8/1965 | Beckett | | 137/625.69 |
| 3,211,164 A * | 10/1965 | Bender et al. | | 137/625.69 |
| 3,234,968 A * | 2/1966 | Frantz | | 137/625.63 |
| 3,240,200 A | 3/1966 | Jones | | 124/11 |
| 3,253,617 A * | 5/1966 | Beckett | | 137/625.69 |
| 3,273,553 A | 9/1966 | Doyle | | 124/3 |
| 3,279,748 A * | 10/1966 | Coulter | | 137/625.69 |
| 3,374,708 A | 3/1968 | Wall et al. | | 89/1 |
| 3,494,344 A | 2/1970 | Vadas et al. | | 124/11 |
| 3,548,708 A | 12/1970 | Hubigh | | 89/1.818 |
| 3,572,310 A | 3/1971 | Chiba | | 124/11 |
| 3,661,182 A * | 5/1972 | Loveless | | 137/625.48 |
| 3,695,246 A | 10/1972 | Filippi et al. | | 124/11 |
| 3,818,887 A | 6/1974 | Akiyama et al. | | 124/15 |
| 3,899,845 A | 8/1975 | Wild et al. | | 42/69 |
| D237,678 S | 11/1975 | Spencer | | D7/179 |
| 3,923,033 A | 12/1975 | Laporte et al. | | 124/8 |
| 3,927,830 A * | 12/1975 | Briski | | 137/625.68 |
| 4,066,000 A | 1/1978 | Rostocil | | 89/198 |
| 4,133,128 A | 1/1979 | Brush | | 42/70 R |
| 4,187,884 A * | 2/1980 | Loveless | | 137/625.69 |
| 4,207,799 A | 6/1980 | Tocco | | 89/196 |
| 4,282,795 A | 8/1981 | Beretta | | 89/148 |
| 4,347,679 A | 9/1982 | Grunig et al. | | 42/84 |
| 4,362,145 A | 12/1982 | Stelcher | | 124/32 |
| 4,516,273 A | 5/1985 | Gregory et al. | | 2/2 |
| 4,589,327 A | 5/1986 | Smith | | 89/144 |
| 4,602,608 A | 7/1986 | Lacam et al. | | 124/74 |
| 4,679,487 A | 7/1987 | Houseman | | 89/140 |
| 4,683,914 A * | 8/1987 | Brisland | | 137/625.48 |
| 4,694,815 A | 9/1987 | Hung | | 124/27 |
| 4,770,153 A | 9/1988 | Edelman | | 124/72 |
| 4,779,245 A | 10/1988 | Chelminski | | 367/144 |
| 4,785,930 A | 11/1988 | Fischer et al. | | 206/3 |
| 4,819,609 A | 4/1989 | Tippmann | | 124/72 |
| 4,899,717 A | 2/1990 | Rutten et al. | | 124/67 |
| 4,936,282 A | 6/1990 | Dobbins et al. | | 124/74 |
| 4,940,138 A | 7/1990 | Hornstein | | 206/218 |
| D321,325 S | 11/1991 | Petrus | | D9/435 |
| 5,063,905 A | 11/1991 | Farrell | | 124/72 |
| 5,068,990 A | 12/1991 | Marzocco | | 42/70.04 |
| 5,078,118 A | 1/1992 | Perrone | | 124/74 |
| 5,149,898 A | 9/1992 | Chesnut et al. | | 42/69.01 |
| 5,222,521 A * | 6/1993 | Kihlberg | | 137/625.69 |
| 5,228,427 A | 7/1993 | Gardner, Jr. | | 124/71 |
| 5,251,533 A | 10/1993 | Layton | | 89/142 |
| 5,261,384 A | 11/1993 | Hu | | 124/66 |
| 5,280,778 A | 1/1994 | Kotsiopoulos | | 124/74 |
| 5,282,454 A | 2/1994 | Bell et al. | | 124/49 |
| 5,293,708 A | 3/1994 | Strayer et al. | | 42/75.03 |
| 5,349,939 A | 9/1994 | Perrone | | 124/76 |
| 5,363,834 A | 11/1994 | Stuchlik | | 124/76 |
| 5,370,105 A | 12/1994 | Firman | | 124/56 |
| 5,413,083 A | 5/1995 | Jones | | 124/32 |
| 5,462,042 A | 10/1995 | Grenwell | | 124/76 |
| D366,514 S | 1/1996 | Hochstrate et al. | | D22/108 |
| 5,503,137 A | 4/1996 | Fusco | | 124/72 |
| 5,596,162 A | 1/1997 | Burns | | 89/128 |
| 5,613,483 A | 3/1997 | Lukas et al. | | 124/73 |
| 5,634,456 A | 6/1997 | Perrone | | 124/76 |
| 5,635,663 A | 6/1997 | Krieger et al. | | 89/142 |
| 5,718,074 A | 2/1998 | Keeney | | 42/69.03 |
| D393,115 S | 3/1998 | Bell et al. | | D32/35 |
| 5,727,538 A | 3/1998 | Ellis | | 124/77 |
| 5,736,720 A | 4/1998 | Bell et al. | | 235/1 |
| 5,755,213 A | 5/1998 | Gardner, Jr. et al. | | 124/73 |
| 5,760,328 A | 6/1998 | Robbins | | 89/129.02 |
| 5,799,434 A | 9/1998 | Krieger et al. | | 42/69.03 |
| 5,816,232 A | 10/1998 | Bell | | 124/51.1 |
| 5,868,637 A | 2/1999 | Poxon | | 473/469 |
| 5,878,736 A | 3/1999 | Lotuaco, III | | 124/71 |
| 5,881,707 A | 3/1999 | Gardner, Jr. | | 124/77 |
| 5,890,479 A | 4/1999 | Morin | | 124/31 |
| 5,913,303 A | 6/1999 | Kotsiopoulos | | 124/31 |
| 5,957,119 A | 9/1999 | Perry et al. | | 124/73 |
| 5,967,133 A | 10/1999 | Gardner, Jr. | | 124/77 |
| 6,003,504 A | 12/1999 | Rice et al. | | 124/73 |
| 6,015,058 A | 1/2000 | Parks | | 220/229 |
| 6,035,843 A | 3/2000 | Smith et al. | | 124/77 |
| 6,048,280 A | 4/2000 | Palmer et al. | | 473/416 |
| 6,055,975 A | 5/2000 | Gallagher et al. | | 124/50 |
| 6,065,460 A | 5/2000 | Lotuaco, III | | 124/72 |
| 6,138,656 A | 10/2000 | Rice et al. | | 124/73 |
| 6,142,137 A | 11/2000 | MacLaughlin | | 124/72 |
| 6,212,812 B1 | 4/2001 | Aigner | | 42/70.06 |
| 6,223,460 B1 | 5/2001 | Schmitter et al. | | 42/70.06 |
| 6,256,917 B1 | 7/2001 | Findlay | | 42/70.06 |
| 6,260,821 B1 | 7/2001 | Perry et al. | | 251/314 |
| 6,311,682 B1 | 11/2001 | Rice et al. | | 124/71 |
| 6,349,711 B1 | 2/2002 | Perry et al. | | 124/73 |
| D454,685 S | 3/2002 | Parks et al. | | D3/254 |
| 6,382,200 B1 | 5/2002 | Levkov | | 124/73 |
| D458,333 S | 6/2002 | Power | | D22/108 |
| D460,502 S | 7/2002 | Traum et al. | | D21/573 |
| 6,439,217 B1 | 8/2002 | Shih | | 124/77 |
| 6,474,325 B2 | 11/2002 | Rice et al. | | 124/71 |
| 6,474,326 B1 | 11/2002 | Smith et al. | | 124/77 |
| 6,494,194 B2 | 12/2002 | Shipachev et al. | | 124/73 |
| 6,494,195 B2 | 12/2002 | Perry et al. | | 124/84 |
| 6,532,949 B1 | 3/2003 | McKendrick | | 124/77 |
| D473,910 S | 4/2003 | Rice et al. | | D22/108 |
| 6,550,468 B1 | 4/2003 | Tippmann, Jr. | | 124/71 |
| 6,553,983 B1 | 4/2003 | Li | | 124/73 |
| 6,578,566 B2 | 6/2003 | Hernandez | | 124/73 |
| 6,590,386 B1 | 7/2003 | Williams | | 324/178 |
| 6,615,814 B1 | 9/2003 | Rice et al. | | 124/71 |
| 6,626,165 B1 | 9/2003 | Bhogal | | 124/77 |
| 6,629,379 B1 | 10/2003 | Doiron | | 42/70.11 |
| 6,637,420 B2 | 10/2003 | Moritz | | 124/73 |
| 6,637,421 B2 | 10/2003 | Smith et al. | | 124/77 |
| 6,644,295 B2 | 11/2003 | Jones | | 124/77 |
| 6,644,296 B2 | 11/2003 | Gardner, Jr. | | 124/77 |
| 6,658,982 B2 | 12/2003 | Cherry | | 89/1.42 |
| D484,926 S | 1/2004 | Rice et al. | | D21/573 |
| 6,694,963 B1 | 2/2004 | Taylor | | 124/32 |
| 6,705,036 B2 | 3/2004 | Orr | | 42/69.01 |
| 6,725,852 B1 | 4/2004 | Yokota et al. | | 124/49 |
| 6,729,497 B2 | 5/2004 | Rice et al. | | 220/835 |
| 6,739,322 B2 | 5/2004 | Rice et al. | | 124/49 |
| 6,748,938 B2 | 6/2004 | Rice et al. | | 124/77 |
| 6,763,822 B1 | 7/2004 | Styles | | 124/77 |
| 6,782,910 B2 * | 8/2004 | Mondani et al. | | 137/625.25 |
| D496,556 S | 9/2004 | Skrocki et al. | | D7/391 |
| 6,802,305 B1 | 10/2004 | Hatcher | | 124/31 |
| 6,802,306 B1 | 10/2004 | Rice | | 124/74 |
| 6,973,748 B2 | 12/2005 | Rice | | 42/69.01 |
| 7,073,533 B2 * | 7/2006 | Bruck et al. | | 137/625.68 |
| 7,127,845 B2 | 10/2006 | Rice et al. | | 42/69.01 |
| 2003/0121927 A1 | 7/2003 | Rice et al. | | 220/833 |
| 2003/0131834 A1 | 7/2003 | Rice et al. | | 124/32 |
| 2003/0154968 A1 | 8/2003 | Rice et al. | | 124/71 |
| 2004/0011344 A1 | 1/2004 | Rice et al. | | 124/73 |
| 2004/0031836 A1 | 2/2004 | Garcia | | 224/665 |
| 2004/0074489 A1 | 4/2004 | Neumaster et al. | | 124/79 |
| 2004/0084040 A1 | 5/2004 | Jones | | 124/77 |

FOREIGN PATENT DOCUMENTS

| | | |
|---|---|---|
| FR | 2801567 | 10/1999 |
| GB | 2252302 | 8/1992 |
| GB | 2370027 | 6/2002 |
| GB | 2391292 | 2/2004 |

* cited by examiner

THREE-WAY VALVE FOR USE WITH PAINTBALL MARKERS

CROSS-REFERENCE TO RELATED APPLICATIONS

This application hereby claims priority to and is a continuation of U.S. patent application Ser. No. 10/948,960, filed Sep. 24, 2004 now abandoned which is a continuation-in-part of U.S. provisional application Ser. No. 60/506,379, filed Sep. 25, 2003, which are hereby incorporated by reference.

FIELD OF THE INVENTION

The present invention generally relates to a three-way valve. Particularly, the three-way valve of the present invention is adapted for use in a paintball marker requiring a tight reduced throw operation with position adjustment and precise airflow control.

BACKGROUND OF THE INVENTION

In conventional systems, three-way valves are known, and may include a valve body forming an operating valve controlled by a valve stem. In these valves the relative movement of the valve stem to the body has the effect of directing fluid in a particular direction.

The valve will typically have three or more holes along its length with each hole separated from the other holes by a ridge or projection on the stem which seals with the valve body. Typically the ridge or projection includes an o-ring seal associated with each ridge or projection to ensure adequate sealing to prevent fluid flow. Each hole or aperture in the valve body will have a consistent diameter to ensure sufficiency of fluid flow for effective operation of the valve to enable it to process sufficient volume of fluid flow to carry out the necessary operations.

While conventional three way valves in the art may be suitable for the purposes for which they were designed, they fail to address all of the needs in the art and they would not however be suitable for the purposes of the present invention, as hereinafter described.

SUMMARY OF THE INVENTION

In accordance with the present invention, there is provided a three-way valve, comprising a valve body, an adjustable valve sleeve mounted within the body for adjustable positioning of multiple line recesses, and a valve stem associated with the valve and movable so as to selectively form a pathway between selected line recesses. One additional aspect of the present invention provides for reduced throw for the valve stem by providing the outermost line recesses with reduced diameter apertures. Preferably, there is a plurality of equally spaced apertures within the line recesses such that the number of such apertures may increase as the diameter of each aperture is reduced. The valve stem is partially sealed to the valve body for directing flow between the multiple line recesses, but once the movement of the stem makes the seal pass the line recesses, the stem may also be unsealed on the end such that the unsealed end becomes an exhaust port to relieve pressure from the selected line recess.

This invention includes a plurality of connector fittings that allow for the passage of a flowable subject or fluid. In the preferred embodiment used for paintball markers the fluid is generally compressed air but the fluid could be a compressed gas or liquid such as water under compression.

A valve body is formed to create a connection point and allow for disassembly of the valve from the body and from the marker frame. The valve is machined in such a way as to allow the passage of air through its hollow interior. The hollow interior receives the valve stem by which the stem is moved along the path of the hollow passage of the valve to allow selective opening of the apertures within the outer recesses of the valve. The valve has a central axial bore running throughout. The valve also has at least one threaded end including external threads which to engage with the internally threaded end of the cylindrical body. The bore has a hex-shaped aperture and a hex key that can be used to engage the valve so as to secure it in a desired manner within the cylindrical body and a knob that includes a knurled or textured outer surface offers an alternate mechanism to adjust the valve sleeve position within the cylinder body. This allows for a fixed position for the body while still providing an adjustable valve by adjusting the sleeve position within the chamber. This adjustment may be done by finger operation using the frictional engagement with the knurled surface which obviates the need for a hex key. If the sleeve is frozen in pace, a hex key aperture is also provided.

As fluid is supplied through the fluid supply line the air is directed through the center equi-spaced aperture and is directed toward the front fluid line by the valve being positioned in such a manner as to allow fluid to flow between the center fluid supply and the front fluid line. When the valve is positioned to release air into the front fluid line, the rear fluid line coupled to an unsealed rear exhaust port to prevent pressure build-up on the rear side of the valve. Alternatively, the rearward position of the valve stem directs the fluid supplied through the second fluid supply line toward the rear fluid line and simultaneously releases the front fluid line flow by directing it through the unsealed front end of the valve stem using this unsealed end as a front exhaust port to prevent pressure build-up on the front side of the valve. In the preferred embodiment a central position the valve stem may use a small length sealed area to seal the central supply line and exhaust the front line through the front exhaust port and the rear line through the rear exhaust port. Alternatively, a long seal provides flow from the central line to both the forward and rearward lines while sealing off all of the lines from the exhaust ports.

It is therefore an object of the invention to provide a three-way valve that directs the fluid flow more efficiently.

Yet another object of the invention is to provide equally spaced apertures around the diameter of the valve body.

Another object of the invention is to provide for reduced diameter of the apertures allowing for precision control of the valve with a reduced stem throw.

It is another object of the invention to provide an external knob for fine adjustment of the valve.

It is another object of the invention to provide for easy assembly and maintenance of the valve.

It is another object of the invention to provide for a reversible flow of fluid through the valve.

It is another object of the invention to provide for multiple exhaust ports.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Figure 1:
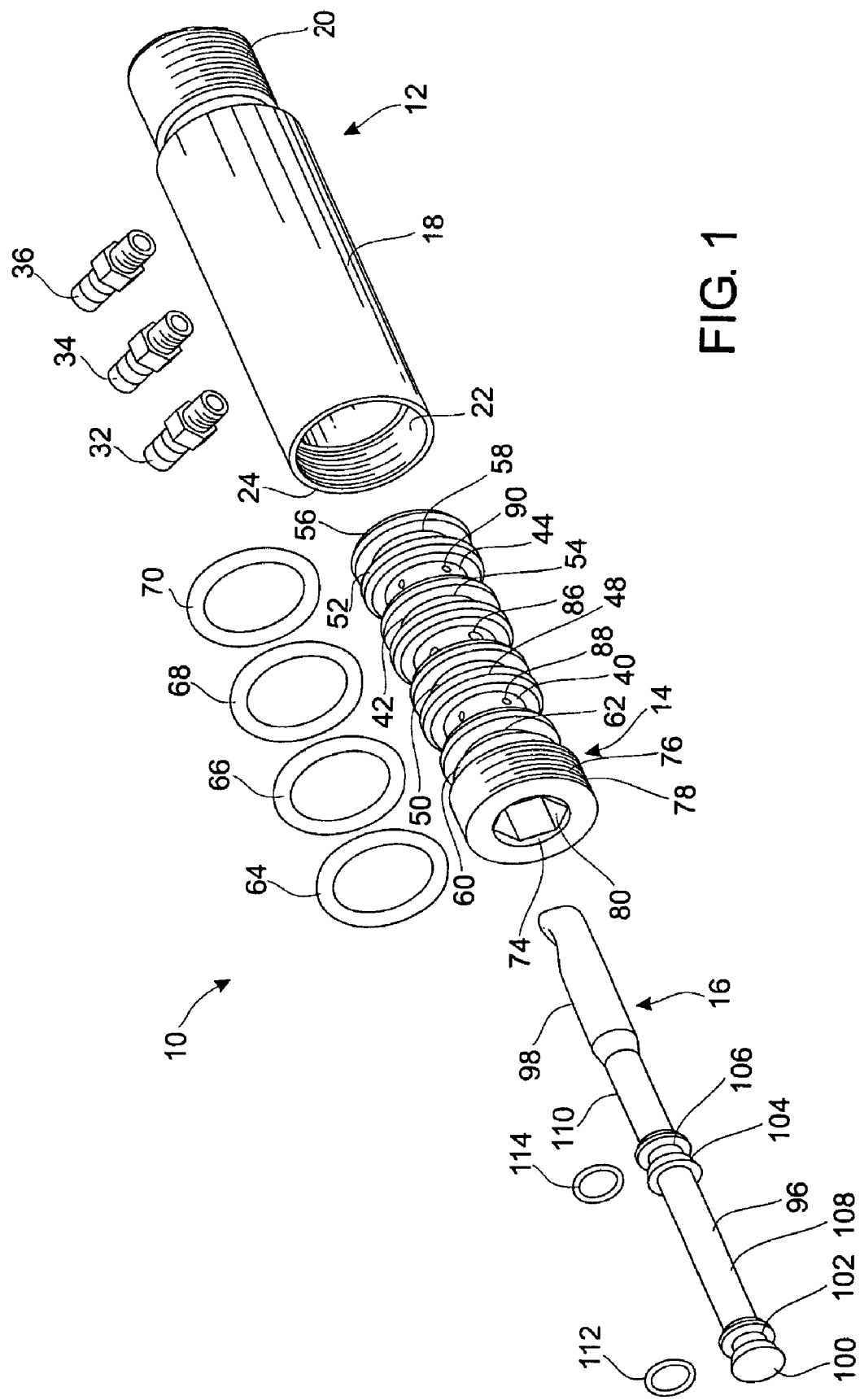
FIG. 1 is an exploded perspective view of a valve in accordance with the invention.
Figure 2:
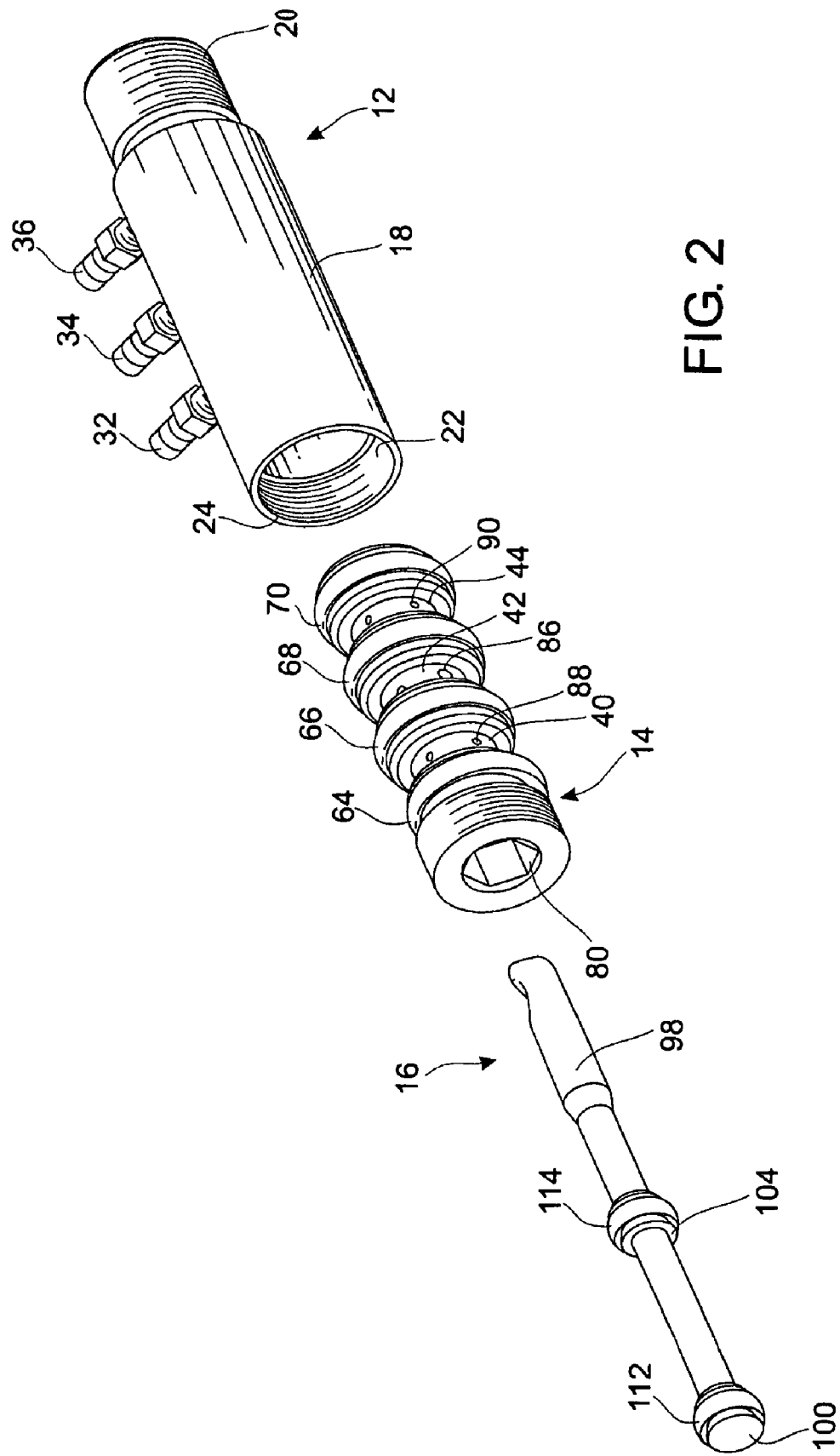
FIG. 2 is an exploded view similar to FIG. 1, with the o-ring seals and fittings installed.

The invention will now be described with reference to the drawings. In the drawings, the same reference numerals are used consistently throughout this description to identify the same or corresponding components in the different embodiments.

With reference to FIGS. 1 thru 3 and 5 through 8 of the drawings, there is shown a three-way valve 10 of the invention comprising a hollow cylindrical body 12, a valve sleeve 14 which is received within the hollow cylindrical body 12, and a valve stem 16, which is received within the valve sleeve 14.

Figure 7:
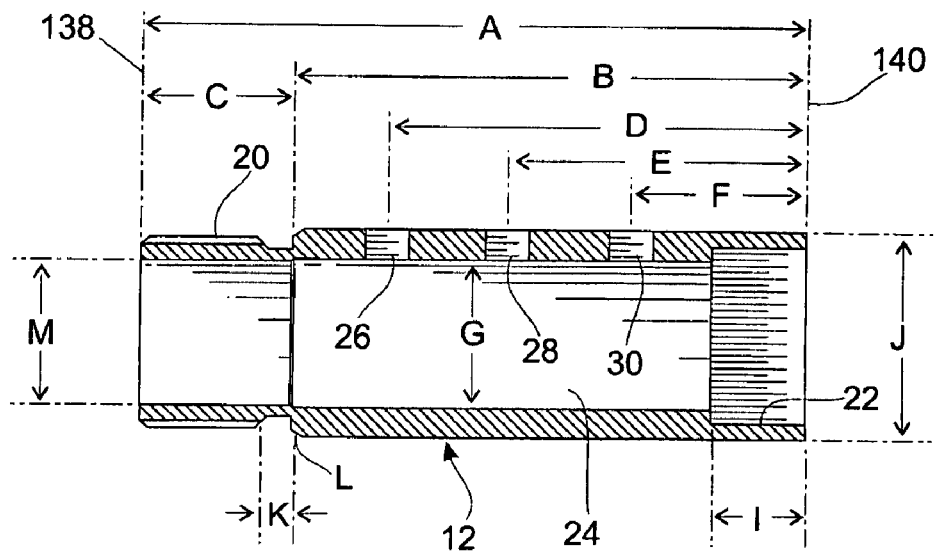
FIG. 7 is a cross-section through the outer body of the valve of one embodiment of the invention.

The hollow cylindrical body 12 comprises a hollow body portion 18, an externally threaded end 20, and an internally threaded end 22. The external threaded end 20 is used to attach the body to the paintball marker. The hollow body portion 18 defines a body chamber 24 in which the valve sleeve 14 is received and the internally threaded end 22 is used to attach the sleeve 14 in the chamber 24 with an adjustable insertion depth. The body portion 18, as seen in FIG. 7, includes a first threaded aperture 26, second threaded aperture 28 and third threaded aperture 30 for respectively receiving the first connector fitting 32, second connector fitting 34, and third connector fitting 36. The first threaded aperture 26, second threaded aperture 28, and third threaded aperture 30 each have threaded edges which are secured with the threads on the first connector fitting 32, second connector fitting 34, and third connector fitting 36.

The valve sleeve 14 is also generally cylindrical in shape and fits snugly within the body chamber 24. The valve sleeve 14 is configured so as to have three recesses, namely, a first lateral sleeve recess 40, a second lateral sleeve recess 42 and a third lateral sleeve recess 44. Four seals are provided to seal the valve sleeve 14 to the valve body 12. A front seal projection 60 is provided having a first seal groove 62 therein. A second seal projection 48 is provided having a second seal groove 50 therein which is formed between the first lateral sleeve recess 40 and the second lateral sleeve recess 42. A third seal projection 52 is provided having a third seal groove 54 therein which is formed between the second lateral sleeve recess 42 and the third lateral sleeve recess 44. Finally, the valve sleeve 14 has an end seal projection 56, having a fourth seal groove 58 therein. A first o-ring seal 64 is received within first seal groove 62, a second o-ring seal 66 is received within second seal groove 50, a third o-ring seal 68 is received within third seal groove 54, and a fourth o-ring seal 70 is received within fourth seal groove 58. When the valve sleeve 14 is received within the body chamber 24, the various o-ring seals in the respective grooves establish a tight fluid seal between the three subdivided sections of the valve sleeve 14 and the cylindrical body 12. The valve sleeve 14 is adjustably held in position by a threaded sleeve end 76 including external threads 78 which engage with the internally threaded end 22 of the cylindrical body 12. As noted by the smooth internal bore of the body shown in FIG. 7, this allows for the threaded engagement between the sleeve 14 and the body 12 to allow for the body 12 to be fixably attached to the paintball marker while allowing a threaded adjustment of the valve sleeve 14 within the valve body to achieve proper positioning of the valve sleeve 14 to the valve stem 16.

The valve sleeve 14 has a central axial bore 74 running therethrough. The central axial bore 74 has a hex-shaped aperture 80 such that a hex key can be used to engage the valve sleeve 14 so as to secure it in a desired manner within the cylindrical body 12.

Figure 5:
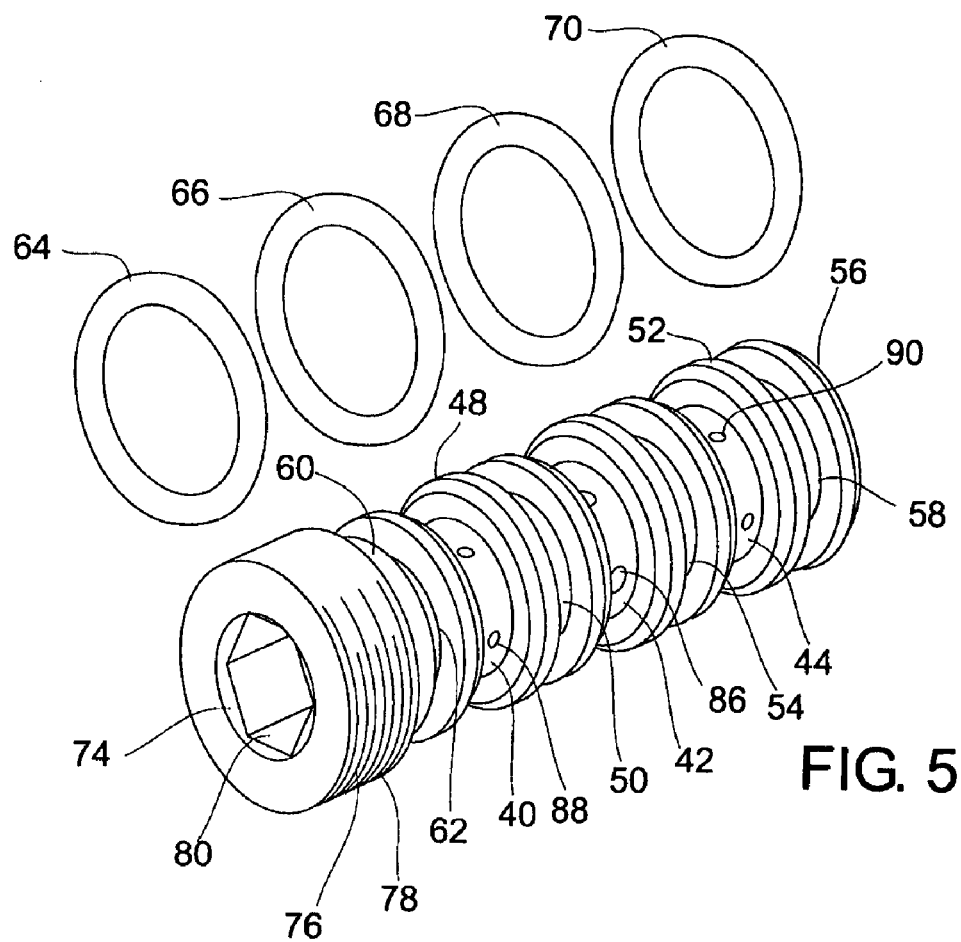
FIG. 5 is a detailed perspective view of a valve sleeve used with the invention, with o-ring seals removed.
Figure 6:
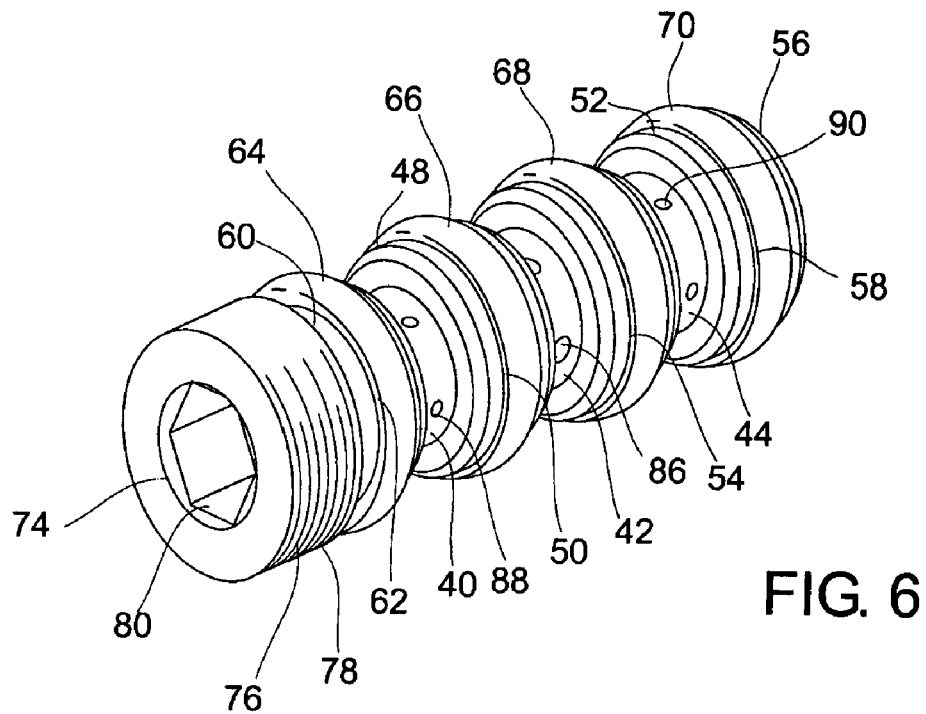
FIG. 6 is an enlarged perspective view similar to that shown in FIG. 5, with the o-ring seals installed.

As noted by FIG. 5, the second lateral sleeve recess 42 on the valve sleeve 14 has a plurality of preferably equi-spaced second recess apertures 86. The preferred embodiment uses five apertures 86 although this number may vary from one embodiment to another. The first lateral sleeve recess 40 also has a plurality of preferably equi-spaced first recess apertures 88 and the third lateral sleeve recess 44 has a plurality of preferably equi-spaced third recess apertures 90. Once again, five apertures is the preferred number although this may also be variable.

It will be noted that the diameter or size of the second recess apertures 86 in the second lateral sleeve recess 42 is significantly larger than the size or diameter of the first recess apertures 88 and third recess apertures 90 in the first lateral sleeve recess 40 and third lateral sleeve recess 44 respectively. These reduced diameters allow for a tighter throw of the valve stem to operate the valve when compared to what would be required with larger apertures. When the valve sleeve 14 is inserted and installed within the cylindrical body 12, the first lateral sleeve recess 40 will register with first threaded aperture 26 and first threaded connector fitting 32; the second lateral sleeve recess 42 will register with second threaded aperture 28 and second threaded connector fitting 34; while the third lateral sleeve recess 44 will register with third threaded aperture 30 and third threaded connector fitting 36.

Figure 4A:
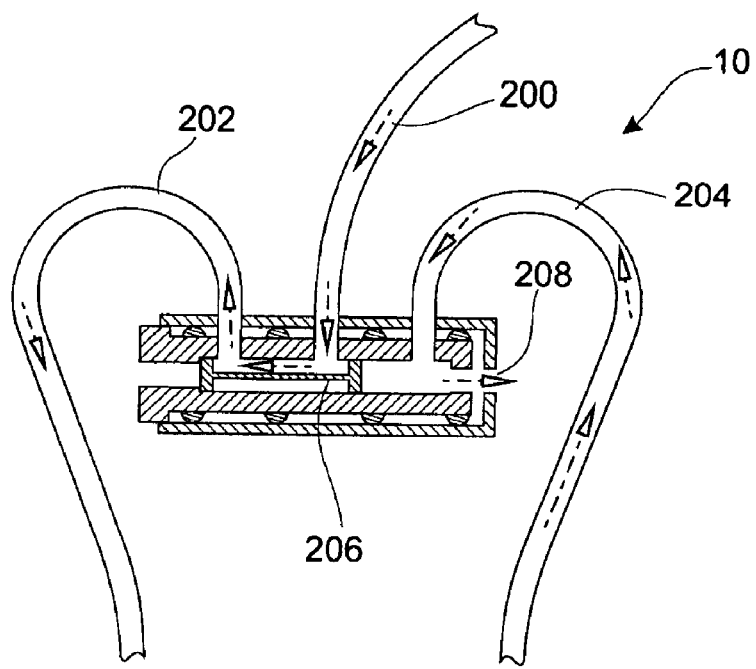
FIG. 4a is a cross-sectional view taken along line 4-4 of FIG. 3 with lines and fluid flow added for an operational description.

FIG. 4a shows a rough drawing of the three-way valve 10 as fluid flow, as depicted by arrows, is supplied through the second fluid line 200. The air is directed toward the first fluid line 202 by the valve stem 206 being positioned in such a manner as to allow fluid to flow between the second fluid line 200 and the first fluid line 202. As noted by this position, when the valve 10 is positioned to release air into the first fluid line 202 the third fluid line 204 flow is directed to a rear exhaust port 208 to prevent pressure build-up on the rear side of the valve.

Figure 4B:
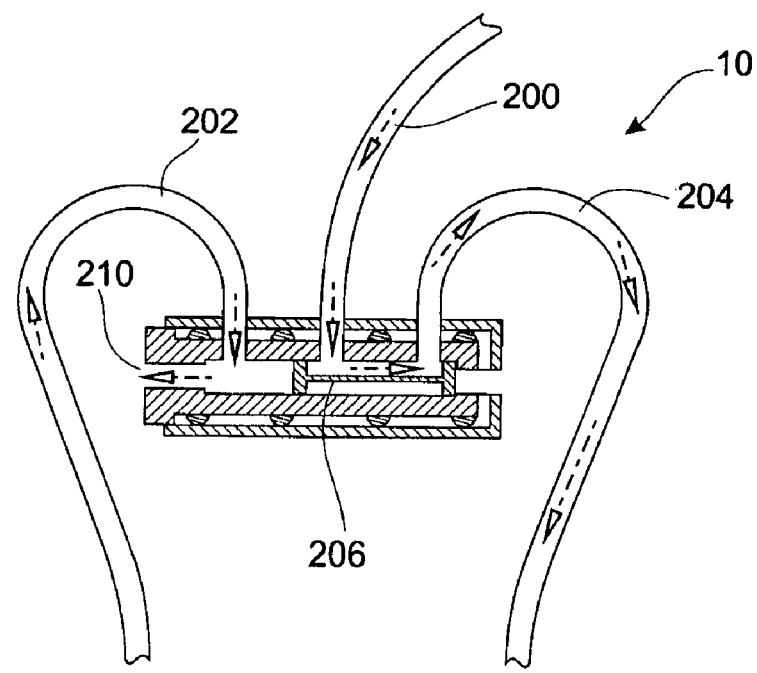
FIG. 4b is a cross sectional view taken along line 4-4 of FIG. 3 with lines and fluid flow added for an operational description.

In FIG. 4b the fluid flow is supplied through the second fluid line 200 and the line air is directed toward the third fluid line 204 by the valve piston 206 being positioned in such a manner as to allow fluid to flow between the second fluid line 200 and the third fluid line 204. When the valve 10 is positioned to release air into the third fluid line 204, the first fluid line 202 flow is directed to a front exhaust port 210 to prevent pressure build-up on the front side of the valve 10.

FIG. 7 shows a three-way cylindrical body 12 with the letters depicting the approximate measurements of such a valve body. Reference characters have been changed to letters to clarify the measurements. The length A of the body is 1.580 inches measured from the left body end 138 to the right body end 140. This type of measurement indiction is provided throughout the drawing as indicated by the reference lines. Outer diameter J is 0.500 inches and inner diameter M is 0.350 inches with the threaded end measuring inward C at 0.300 inches with a thread recess K of 0.062 inches. From the thread recess edge L to the right body end 140, is 1.280 inches shown as partial body length B. The center of the threaded apertures 26, 28, and 30 are measured from the right body end 140 as 1.035 inches D, 0.735 inches E, and 0.435 inches F. The interior threaded portion I is threaded 0.225 inches from the right body end 140 towards the opposing side. The central portion of the body has a diameter G of 0.362 inches with a tolerance + or −0.001 inches.

Figure 8:
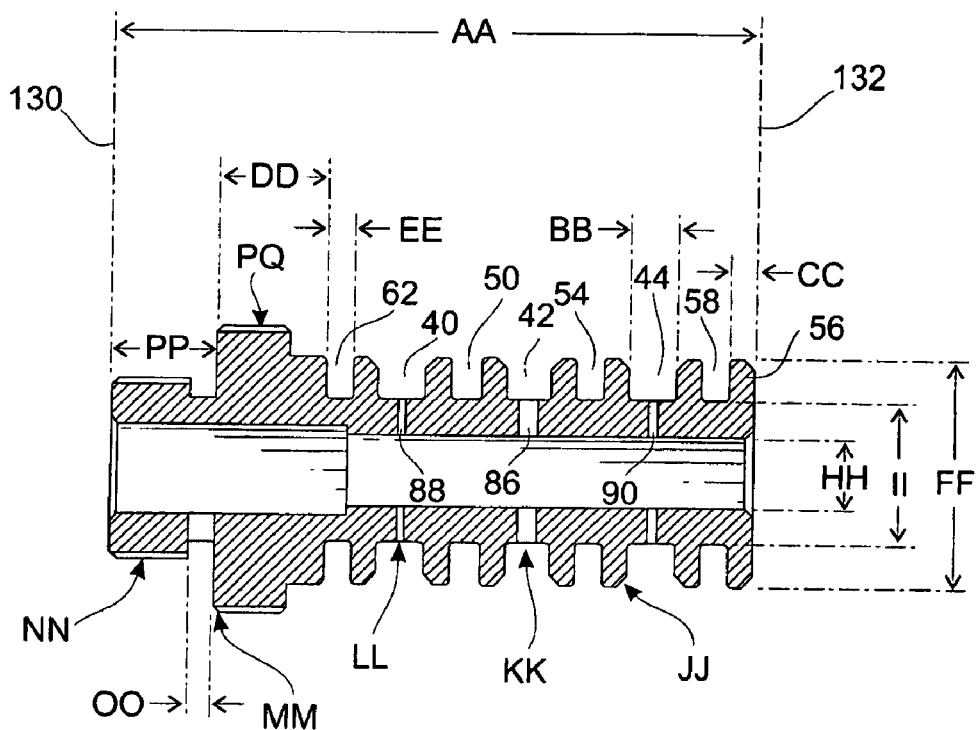
FIG. 8 is a cross-section through the valve sleeve of one embodiment of the invention.

FIG. 8 is a cross-sectional view of a three-way valve sleeve 14 and depicts approximate measurements as provided by the following table.

| Item | Description | Measurement |
| --- | --- | --- |
| AA | Sleeve length AA | 1.545 |
| BB | third lateral sleeve recess 44 | 0.110 |
| CC | end seal projection 56 | 0.060 |
| DD | front thread flange | 0.265 |
| EE | first seal groove 62 | 0.070 |
| FF | outer sleeve projection diameter | 0.360 |
| HH | inner sleeve bore diameter | 0.1765 |
| II | inner sleeve projection diameter | 0.262 |
| JJ | projection clip angles | 0.025 × 45 degrees |
| KK | central aperture diameter | 0.052 |
| LL | outer aperture diameters | 0.020 |
| MM | flange clip angle | 0.020 × 45 degrees |
| NN | external head detail | 5/16-24 UM |
| OO | head offset | 0.063 |
| PP | head length | 0.250 |
| QQ | flat thread | 7/16-32 UN-2A |

In use, the second threaded connector fitting 34 will typically be connected to a source of air under pressure, while the first threaded connector fitting 32 may be directed towards, for example, the front of a ram or other structure, and the third threaded connector fitting 36 connected to provide air under pressure to the rear of the ram or other type of structure.

The valve stem 16 comprises a valve shaft 96 of generally cylindrical and elongate shape, and is received within the central axial bore 74 of the valve sleeve 14. The valve stem 16 has an shaft end section 98, a front shaft seal projection 100, including a first shaft seal groove 102 therein, and a back shaft seal projection 104, including a second shaft seal groove 106 therein. A first annular shaft recess 108 is defined between the front shaft seal projection 100 and back shaft seal projection 104. A second annular shaft recess 110 is formed between the back shaft seal projection 104 and the shaft end section 98. First o-ring shaft seal 112 is received within first shaft seal groove 102, while Second o-ring shaft seal 114 is received within second shaft seal groove 106. The valve stem 16 is received within the central axial bore 74 of the valve sleeve 14, and reciprocates therein to select fluid pathways, as will be described. The O-ring seals 112 and 114 ensure a fluid tight seal between the valve stem 16 and the central axial bore 74 of the valve sleeve 14.

The position of the valve stem 16 within the central axial bore 74 will determine the flow path of fluid, typically but not necessarily air under pressure, through the valve 10. Thus, when the valve stem 16 is in the forward position with the front shaft seal projection 100 thereof near the threaded sleeve end 76 of the valve sleeve 14, the second recess apertures 86 in the second lateral sleeve recess 42 will be in communication with the first recess apertures 88 through the first annular shaft recess 108, so that air entering the second threaded connector fitting 34 will exit the first threaded connector fitting 32. Conversely, when the valve stem 16 reciprocates axially so that the front shaft seal projection 100 is away from the threaded sleeve end 76, the second recess apertures 86 will be in communication with the third recess apertures 90 through first annular shaft recess 108, so that fluid under pressure can flow from the second threaded connector fitting 34 through the valve sleeve 14 and out through the third threaded connector fitting 36.

In the manner described above, the three-way valve 10 will thus provide a pathway, in one embodiment of the invention, of air from the second threaded connector fitting 34 through the first threaded connector fitting 32. Conversely, the valve stem 16 may be moved to a rear ward position so as to direct a pathway of air from the second threaded connector fitting 34 to the third threaded connector fitting 36. In use with respect to a paintball marker, the three-way valve 10 of the invention will operate by having the valve stem 16 being caused to move so as to conform with the cycle and operation of the paintball marker.

Figure 3:
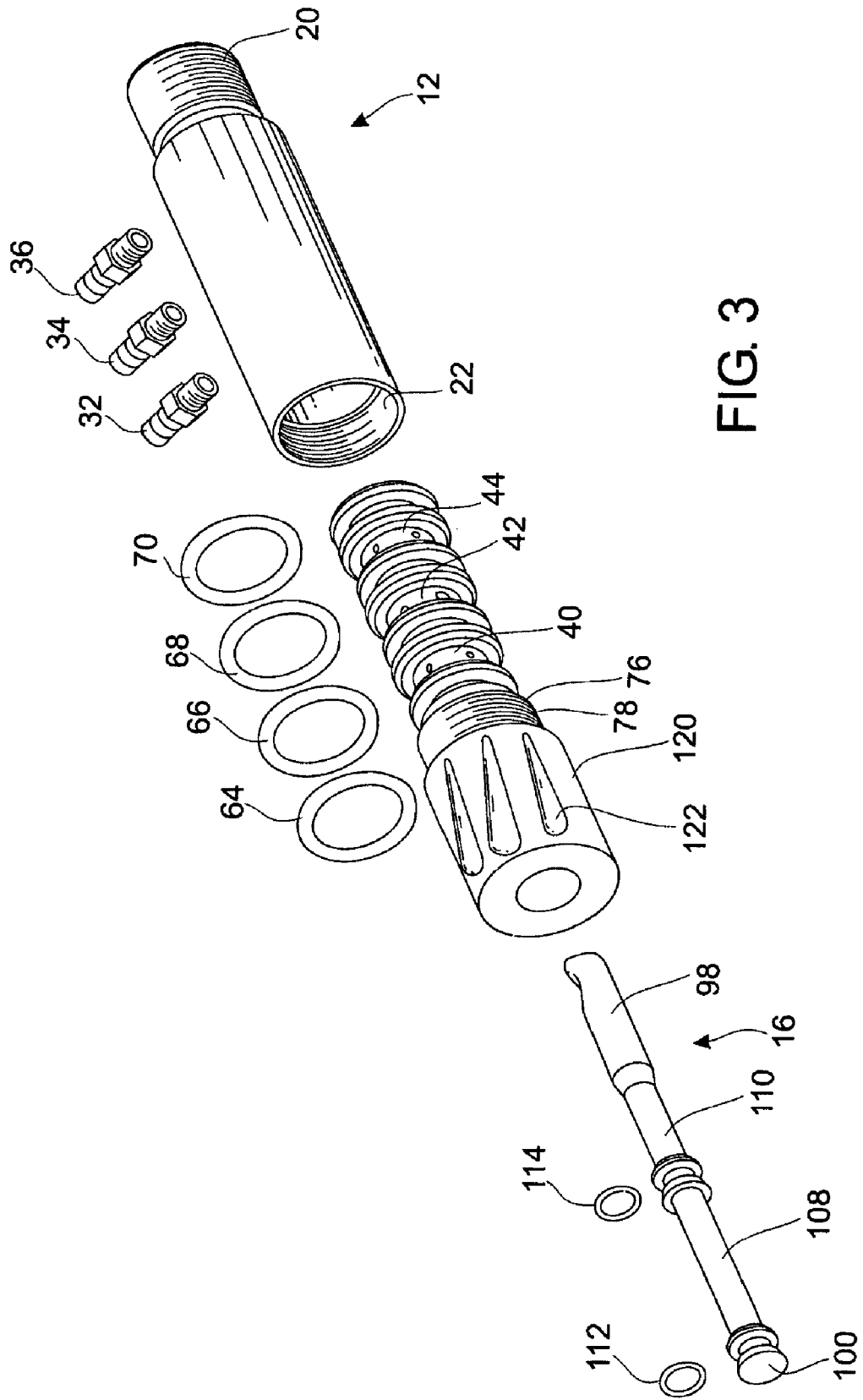
FIG. 3 is an exploded perspective view similar to FIG. 1, with the addition of an adjustment knob.

FIG. 3 of the drawings show a three-way valve 10 in accordance with the invention, and further comprising a sleeve adjustment knob 120 including a knurled or textured outer surface 122. The sleeve adjustment knob 120 offers an alternate mechanism by means of which the position of the valve sleeve 14 can be mechanically adjusted or varied within the cylinder body 12, as needed or desired. The sleeve adjustment knob 120 shown in FIG. 3 allows for insertion and/or adjustment of the position of the valve sleeve 14 within the body chamber 24 by finger operation, and thus obviates the need for a hex key which would be required to engage the hex-shaped aperture 80 in the three-way valve 10 as illustrated in FIG. 1 of the drawings.

The size and positioning of the first recess apertures 88, second recess apertures 86, and third recess apertures 90 along the valve sleeve 14 provide benefits and advantages for the control and operation of the three-way valve 10 and the device such as a paintball gun or marker to which it is connected. A significant advantage of having the small diameter first recess apertures 88 and third recess apertures 90, as they are located in the first lateral sleeve recess 40 and third lateral sleeve recess 44, allow much tighter control of the valve 10 since the reduced size of the first recess apertures 88 and third recess apertures 90 facilitates the operation of the valve by very small shifts of distance or movement of the valve stem 16 in order to effect opening or closing of these apertures. For example, a first recess aperture 88 or third recess aperture 90 having a diameter of reduced size of, for example, 50%, will halve the amount of movement necessary for the stem 16 seal 112, 114 to cross the aperture to open or close that aperture. This is because the valve stem 16 only needs to move a distance more or less equivalent to the diameter of the first recess apertures 88 or third recess apertures 90 to open or close it. It follows that a reduced size diameter will result in less movement required by the valve stem 16 to open or close the apertures 88, 90.

Further, the invention provides the advantage of fine mechanical adjustment of the relative position of the valve sleeve 14 in the cylinder body 12, as seen in FIG. 3, by means of rotation of the valve sleeve 14, using a hex key in the hex-shaped aperture 80, or by rotating the sleeve adjustment knob 120. This may slightly shift the position of the second recess apertures 86, first recess apertures 88 and third recess apertures 90 in relation to the body 12 or stem 16 providing additional flexibility and the ability to fine-tune the valve for optimal operation.

While the first recess apertures 88 and third recess apertures 90 may be of small diameter, more such apertures may be provided circumferentially in the first lateral sleeve recess 40 and third lateral sleeve recess 44 so as to ensure sufficient flow of air to effect the requisite operations.

Since the small diameter holes require less shift in distance to operate the three-way valve 10 of the invention, when the valve 10 is used on a paintball marker or gun, this will have the concomitant effect of requiring a shorter trigger pull to initiate firing and reloading or cocking operations. The valve 10 of the invention therefore allows the positioning of the various components thereof to be adjusted so that the discharge holes or first recess apertures 88 and third recess apertures 90 are optimally located in the cylindrical body 12. This offers a clear advantage over previously used three-way valves having larger diameter single apertures, whereby movement of the valve stem 16 was necessary to a much larger degree to cross the large diameter of the single hole. Although the diameter of the present inventions apertures 86, 88, 90 may be smaller, the cylindrical construction provides that many more hole may be provided around the cylinder which can actually result in an increase of fluid volume flow due to these multiple holes.

By way of example only, the first recess apertures 88 and third recess apertures 90 may have a diameter of approximately 0.020 inches. The normal size diameter in such a valve may be 0.060 inches or more. This allows for a significant reduction in the distances moved by certain components to initiate and carry out operations.

It will be appreciated that the second recess apertures 86 in the second lateral sleeve recess 42 need not be of reduced diameter, since air will always flow through the second lateral sleeve recess 42, which is this always open. The only issue is therefore whether the position of the various components of he three-way valve 10 will result in such air being discharged through first lateral sleeve recess 40, or third lateral sleeve recess 44, and this is determined by the positioning of the valve stem 16.

It will also be appreciated that the shorter trigger pull required by a valve of the present invention produces better control of firing, as well as an improved firing rate, namely, the shots fired per second.

Thus, in accordance with the invention, there is provided a three-way valve, comprising a valve body, a valve for mounting within the body, the valve having an line recess and a first and second line recess, a valve stem associated with the valve and movable so as to selectively form a pathway between the line recess and the first line recess, or the line recess and the second line recess, the first and second line recesses having reduced diameter apertures. Preferably, there is a plurality of apertures within the line recesses, and the number of such apertures may increase as the diameter of each aperture is reduced. Preferably, the apertures are equi-spaced in the line recesses.

In accordance with another aspect of the invention, the valve may be manually adjustable so as to be located within an optimal position in the cylinder body.

The valve of the invention may have a mechanical adjustment element for varying the position of the valve within the body, to reach an optimal operational position. The adjustable element may comprise an opening or aperture in the shape of a hex, to be engaged by a hex key, or an externally engagable knob attached to the valve, for manually positioning and setting the valve within the cylinder body.

Preferably, appropriately located O-ring seals are positioned between the body and the valve, and the valve and the valve stem, to ensure an effective tight fluid seal between these various components.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Reference numbers used throughout the drawings are detailed as follows:

three-way valve 10
hollow cylindrical body 12
valve sleeve 14
valve stem 16
hollow body portion 18
externally threaded end 20
internally threaded end 22
hollow body portion 18
body chamber 24
first threaded aperture 26
second threaded aperture 28
third threaded aperture 30
first threaded connector fitting 32
second threaded connector fitting 34
third threaded connector fitting 36
first lateral sleeve recess 40
second lateral sleeve recess 42
third lateral sleeve recess 44
second seal projection 48
second seal groove 50
third seal projection 52
third seal groove 54
end seal projection 56
fourth seal groove 58
front seal projection 60
first seal groove 62
first o-ring seal 64
second o-ring seal 66
third o-ring seal 68
fourth o-ring seal 70
central axial bore 74
threaded sleeve end 76
external threads 78
hex-shaped aperture 80
second recess apertures 86
first recess apertures 88
third recess apertures 90
valve shaft 96
shaft end section 98
front shaft seal projection 100
first shaft seal groove 102
back shaft seal projection 104
second shaft seal groove 106
first annular shaft recess 108
second annular shaft recess 110
first o-ring shaft seal 112
second o-ring shaft seal 114 sleeve adjustment knob 120
knurled or textured outer surface 122
left valve end 130
right valve end 132
left body end 138
right body end 140
second fluid line 200
first fluid line 202
third fluid line 204
valve piston 206
rear exhaust port 208
body length A
partial body length B
external thread length C
first aperture position D
second aperture position E
third aperture position F
central interior body diameter G
interior threaded portion I
outer body diameter J
thread recess K
thread recess edge L
inner body diameter M
Sleeve length AA
third lateral sleeve recess BB
end seal projection CC
front thread flange DD
first seal groove EE
outer sleeve projection diameter FF
inner sleeve bore diameter HH
inner sleeve projection diameter II
projection clip angles JJ
central aperture diameter KK
outer aperture diameters LL
flange clip angle MM
external head detail NN
head offset OO
head length PP
flat thread QQ

Having thus described the invention, what is desired to be protected by Letters Patent is presented in the subsequently appended claims.

What is claimed is:

1. A valve apparatus, comprising:
an external body defining an internal cavity with a first capturing element, the external body further defining at least a first fluid connection, a second fluid connection, and a third fluid connection;
a single body internal valve sleeve adapted to sealably engage the internal sleeve cavity to an adjustable depth by using a second sleeve capturing element adapted to engage the first sleeve capturing element, the depth of the internal valve sleeve adapted to be adjusted by a force external to the external body, the internal valve sleeve defining a first sealed chamber having a first aperture set flowably connected to the first fluid connection, a second sealed chamber having a second aperture set flowably connected to the second fluid connection, and a third sealed chamber having a third aperture set flowably connected to the third fluid connection;
the internal valve sleeve further defining an internal stem bore with at least a first unsealed end forming a first exhaust port;
a valve stem including a sealed section, the valve stem adapted to sealably move within the internal stem bore to alternatively provide a first flow path from the first aperture set to the second aperture set or provide a second flow path from the second aperture set to the third aperture set; and,
at least one seal adapted to sealably contact the valve stem and the internal stem bore, the seal adapted to sealably move within the internal stem bore.

2. The apparatus of claim 1, wherein the first sleeve capturing element and the second sleeve capturing element are controllably engagable to adjust the depth of the internal valve sleeve in the eternal body.

3. The apparatus of claim 1, wherein the first sleeve capturing element and the second sleeve capturing element are mating threads.

4. The apparatus of claim 1, the sleeve further defining external frictional knurling.

5. The apparatus of claim 1, the sleeve further defining a tool engagement aperture.

6. The apparatus of claim 5, the tool engagement aperture comprising a hex wrench socket.

7. The apparatus of claim 1, the first aperture set including at least one aperture with a first diameter and the second aperture set having at least one aperture with a second diameter wherein the first diameter is smaller than the second diameter.

8. The apparatus of claim 1, the first aperture set including multiple apertures diametrically positioned around the internal valve sleeve.

9. The apparatus of claim 1, the second aperture set including multiple apertures diametrically positioned around the internal valve sleeve.

10. The apparatus of claim 1, the second aperture set including at least one aperture with a second diameter and the third aperture set having at least one aperture with a third diameter wherein the second diameter is larger than the third diameter.

11. The apparatus of claim 1, the third aperture set including multiple apertures diametrically positioned around the internal valve sleeve.

12. A valve apparatus, comprising:
an external body defining an internal cavity with a first capturing element, the external body further defining at least a first fluid connection, a second fluid connection, and a third fluid connection;
a single body internal valve sleeve adapted to sealably engage the internal sleeve cavity to an adjustable depth by using a second sleeve capturing element adapted to engage the first sleeve capturing element, the depth of the internal valve sleeve adapted to be adjusted by a force external to the external body, the internal valve sleeve defining a first sealed chamber having a first aperture set flowably connected to the first fluid connection, a second sealed chamber having a second aperture set flowably connected to the second fluid connection, and a third sealed chamber having a third aperture set flowably connected to the third fluid connection, the internal valve sleeve further defining an internal stem bore with at least a first unsealed end forming a first exhaust port;
a valve stem adapted to sealably move within the internal stem bore to alternatively provide a flow path from the first aperture set to the second aperture set or provide a flow path from the first aperture set to the first exhaust port; and
at least one seal adapted to sealably contact the valve stem and the internal stem bore, the seal adapted to sealably move within the internal stem bore.

13. The apparatus of claim 12, wherein the first sleeve capturing element and the second sleeve capturing element are controllably engagable to adjust the depth of the internal valve sleeve in the external body.

14. The apparatus of claim 12, the sleeve further defining external frictional knurling.

15. The apparatus of claim 12, the sleeve further defining a tool engagement aperture.

16. The apparatus of claim 12, the first aperture set including at least one aperture with a first diameter and the second aperture set having at least one aperture with a second diameter wherein the first diameter is smaller than the second diameter.

17. The apparatus of claim 12, the internal valve further defining a second unsealed end forming a second exhaust port
wherein when the valve stem provides for a flow path from the second aperture set to the first aperture set the valve stem is adapted to provide a flow path from the third aperture set to the second exhaust port.

18. A valve apparatus, comprising:
an external body defining, an internal cavity with a first capturing element, the external body further defining at least a first fluid connection, a second fluid connection, and a third fluid connection;
a single body internal valve sleeve adapted to sealably engage the internal sleeve cavity to an adjustable depth by using a second sleeve capturing element adapted to engage the first sleeve capturing element, the internal valve sleeve defining a first sealed chamber having a first aperture set flowably connected to the first fluid connection, a second sealed chamber having a second aperture set flowably connected to the second fluid connection, and a third sealed chamber having a third aperture set flowably connected to the third fluid connection;
the internal valve sleeve further defining an internal stem bore with at least a first unsealed end forming a first exhaust port;
a valve stem including a healed section, the valve stem adapted to sealably move within the internal stem bore to alternatively provide a first flow path from the first aperture set to the second aperture set or provide a second flow path from the second aperture set to the third aperture set; and,
at least one seal adapted to sealably contact the valve stein and the internal stem bore, the seal adapted to sealably move within the internal stem bore.

19. The apparatus of claim 18, wherein the first sleeve capturing element and the second sleeve capturing element are controllably engagable to adjust the depth of the internal valve sleeve in the external body.

20. The apparatus of claim 18, the first aperture set including at least one aperture with a first diameter and the second aperture set having at least one aperture with a second diameter wherein the first diameter is smaller than the second diameter.

* * * * *